United States Patent
Eylenbosch

(10) Patent No.: US 7,600,470 B2
(45) Date of Patent: Oct. 13, 2009

(54) SQUARE BALER FOR FORMING SLICED BALES

(75) Inventor: Kris Eylenbosch, Ghent (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/191,080

(22) Filed: Aug. 13, 2008

(65) Prior Publication Data

US 2009/0044710 A1 Feb. 19, 2009

(30) Foreign Application Priority Data

Aug. 14, 2007 (GB) .................. 0715748.0

(51) Int. Cl.
*B65B 13/26* (2006.01)
(52) U.S. Cl. .................. 100/33 R; 100/19 R; 289/2
(58) Field of Classification Search .................. 100/4, 100/11, 19 R, 19 A, 20, 31, 33 R; 289/2, 289/6, 11, 13, 14

See application file for complete search history.

(56) References Cited

U.S. PATENT DOCUMENTS

| 4,142,746 A | 3/1979 | White | |
|---|---|---|---|
| 4,735,446 A * | 4/1988 | Homberg | 289/2 |
| 5,829,346 A * | 11/1998 | Ast | 100/19 R |
| 7,296,828 B2 | 11/2007 | Schoonheere et al. | |

FOREIGN PATENT DOCUMENTS

| EP | 0 286 900 B1 | 10/1988 |
|---|---|---|
| EP | 1 411 759 B1 | 4/2004 |
| EP | 1 584 227 B1 | 10/2005 |
| GB | 2 079 329 A | 1/1982 |
| GB | 2 141 664 A | 1/1985 |

\* cited by examiner

*Primary Examiner*—Jimmy T Nguyen
(74) *Attorney, Agent, or Firm*—Patrick M. Sheldrake; John William Stader; Michael G. Harms

(57) ABSTRACT

A baler is described for forming square bales made up of several separately tied slices. The baler has a bale chamber and a plurality of needles movable in unison through the bale chamber to pass respective strands of twine from one side of the bale chamber to associated knotters located on the opposite side of the bale chamber. A first set of permanently operative knotters knot strands of twine tied around individual slices on each occasion that the needles are moved through the bale chamber. A second set of knitters configured to be selectively disabled by movement of a frame carrying their twine engaging components to a position out of reach of the tip of the needles, knot the remaining strands of twine only at the end of the formation of a complete bale.

5 Claims, 4 Drawing Sheets

SQUARE BALER FOR FORMING SLICED BALES

FIELD OF THE INVENTION

The present invention relates to square balers and in particular to the mechanism used for tying bales with twine and making knots in the twine.

BACKGROUND OF THE INVENTION

Balers are machines that can be self-propelled but are more commonly towed behind a tractor and driven from the tractor take-off shaft. They fall into two types, namely round balers and square balers. Round balers are used to produce cylindrical bales that are normally wrapped in a mesh or a film after they have been formed. Square balers produce square-sided bales that are tied by separate loops of twine spaced across the width of each bale. The present invention is only applicable to square balers.

To explain, by way of background, the construction and operation of square balers and knotters of the type to which the present invention relates, reference will be made to the accompanying FIGS. 1, 2 and 3. The three drawings are derived from and more fully explained in U.S. Pat. No. 4,142, 746, which is imported herein by reference. In these drawings, which will be described herein only to the extent necessary for an understanding of the present invention:

FIG. 1 is a fragmentary, elevational view of a baler;

FIG. 2 a diagrammatic view of a complete and a partial double-knotted loop; and

FIG. 3 is an enlarged, fragmentary, elevational view of the knotter, needle and associated mechanisms in mid cycle.

The baler 20 partially illustrated in FIG. 1 has a rectangular bale case 22 that is supported by one or more ground wheels 24. The bale case 22 defines a bale chamber 26 that is loaded through a curved duct 28 approaching the case 22 from its lower end. A plunger 30 reciprocates within the bale case 22 to pack intermittently fresh charges of material from the duct 28 rearwardly in the chamber 26. When the bale reaches a predetermined size, a trigger 34 is pulled by a rod 36 connected to a suitable bale length sensor (not shown) to engage a dog clutch 38. This connects a knotter 40 and a needle 42 to a source of driving power by way of a drive chain 44 associated with the clutch 38, so as to initiate the tying operation.

The needle 42 is mounted on the bale case 22 by a pivot 46 and is swung back and forth through the bale chamber 26 by a linkage 48 which is activated by the clutch 38. The needle 42 has a rest position fully below the bale case 22 as illustrated in FIG. 1 and a position extended completely across the bale case 22. The tip of needle 42 has an eyelet 50 (see FIG. 3) defined between two transversely extending rollers 58,60 through which a strand of twine is threaded.

FIG. 2 shows the nature of the binding loop that is produced in the present invention. The finished product is in the nature of a loop 62 that completely surrounds the finished bale. The loop 62 is made from two strands of binding material, namely a first strand 64 extending along the top side of the bale and a second strand 66 along the bottom of the bale and its two opposite ends. Two knots 68 and 70 appear in the loop 62 at those locations where the strands 64 and 66 meet.

To the left of the loop 62 in FIG. 2 there is shown a partial loop 62a which is in the process of being formed. The top strand 64a is drawn from a source of supply 72, while the bottom strand 66a emanates from an entirely separate, second, source of supply 74. At the particular point in the sequence chosen for illustration, the knot 68a has been formed shortly after the knot 70 was formed, and the bale is approaching that length where the needle 42 is ready to swing into operation and present the strands 64a and 66a to the knotter 40 to form the second knot.

As better shown in FIG. 3, the knotter 40 includes a generally circular element 76 that is secured to a drive shaft 78 for rotation with the latter through one full revolution when the clutch 38 is engaged. The knotter 40 includes a forwardly inclined frame 80, which is conventionally attached to the top of the bale case 22 and additionally supports various other twine engaging components used in forming the knots in response to rotation of the element 76.

These twine engaging components include a rotary bill hook member 82 supported by the frame 80 for rotation about an inclined axis 84, a multi-disc holder 86 rearwardly adjacent the bill hook 82 for the holding strands 64a and 66a in position for engagement by the bill hook 82 during rotation of the latter, and means for releasing the connected strands from the holder 86 in the form of an arm 88 pivoted to the frame 80 by a bolt 90. The lower end of the arm 88 is forked, defining a crotch 92 that opens away from the holder 86 beneath the bill hook 82. The crotch 92 carries a cutter between the bill hook 82 and the holder 86 for severing the strands 64a, 66a in response to swinging movement of the arm 88 in the proper direction. Such movement of the arm 88 to operate the cutter also serves to engage the proximal areas of the crotch 92 with a knot formed on the bill hook 82 for stripping such knot off the bill hook 82.

In order to transmit driving power from the element 76 to the bill hook 82, the latter is provided with a gear 96 which is disposed for meshing engagement with a pair of circumferentially spaced gear stretches on the element 76. Similarly, driving power is transmitted to the discs 86 of the holder 86 through a worm gear drive 102 and a bevel gear 104 in position for sequential meshing engagement with a pair of circumferentially spaced gear sections on the element 76. Power to swing the arm 88 about the pivot bolt 90 is obtained through a cam follower 110 at the upper end of the arm 88 beyond the pivot bolt 90 which is disposed within a cam track 112 on the element 76. A pair of circumferentially spaced cam shoulders in the track are positioned to sequentially engage the follower 110 to operate the latter.

The type of knotting system shown in FIGS. 2 and 3 and described in U.S. Pat. No. 4,142,746 is known as a double knotter for reasons that are apparent from FIG. 2. In particular, two knots are present in each loop surrounding a bale and as soon as a knot 70 is formed to complete a bale a second knot 68a is formed to tie the strands of twine from the sources 72 and 74 to one another to commence the next bale. Once the second knot 70 has been tied, both strands are released from the knotter and are free to move as the bale grows. This type of knotter is to be distinguished from single knotters in which one end of a single strand of twine is clamped in the knotter as the bale grows. When the bale is complete, the other end of the strand is brought by the needle to the knotter after having the twine has been passed around the bale, and it is tied to the end previously gripped by the knotter. After having been severed from the tied bale, the end of the twine remains gripped in the knotter for the commencement of the next bale. The present invention is only applicable to double knotter, as described in U.S. Pat. No. 4,142,746 for reasons that will be made clear below.

It is sometimes desired to form a large bale by tying together several slimmer bales, which will herein be termed "slices". If a bale has, say, six twines tied around it, one could actuate the second and fifth knotters to tie twine around every single slice and the remaining four knotters less frequently to tie knots around a completed bale made up of several slices.

A baler that operates in this manner is described in EP 1,411,759. In this patent, two separately movable groups of needles are provided, which are pivotable either about spaced parallel axes or about concentric axes. One group of needles comprises the two needles used to tie the slices and is operated after each slice has been formed and the other group of needles carries the remaining four needles and is operated only when a complete bale comprising the required number of slices has been formed.

The prior art balers capable of producing bales in which slices are separately tied thus require special needle yokes which allow groups of needles to be raised separately through the bale chamber. If two separate yokes pivotable about spaced parallel axes are used, the needles of the two groups then need to be of different length.

The present invention seeks therefore to provide an alternative and simpler construction of a knotting system which enables the formation of a bale made up of several individually tied slices while requiring no modification to the yoke or needle assembly.

SUMMARY OF THE INVENTION

According to the present invention, there is provided a baler having a bale chamber and a plurality of needles movable through the bale chamber to pass respective strands of twine from one side of the bale chamber to associated knotters located on the opposite side of the bale chamber, comprising means for moving all the needles through the bale chamber upon completion of each slice, a first set of permanently operative knotters for knotting strands of twine tied around individual slices on each occasion that the needles are moved through the bale chamber, and a second set of knotters capable of being selectively disabled by movement of a frame of the knotter carrying twine engaging components to a position out of reach of the associated strands of twine, the knotters of the second set being rendered operative to knot the associated strands of twine only at the end of the formation of a complete bale.

Because all the twines are passed through the bale chamber on completion of every slice as well as the completion of every bale, there is no need to provide two separate needle assemblies and all the needles can be mounted on a common shaft to pivot in unison about the same axle. The strands to be tied around the slices are knotted after the formation of each slice and their knotters are positioned and designed to operate in a conventional manner each time that the second strand 66a is brought into the knotter by one of the needles. In the remaining knotters, however, the frames carrying the twine engaging components are moved to inoperative positions when only a slice is being tied and are moved back to their operative positions only after a complete bale has been formed. The baler thus has slice forming cycles in which only some of the strands of twine are tied to form slices and bale forming cycles in which all the strands are tied to tie a completed bale as well as the last slice comprised in the bale.

The rotation of the frame of the knotter will only result in the twine engaging components remaining out of reach of the strands of twine brought to the knotter by the tip of the needle 42 but will not prevent these components from going through the same motions as they would in tying a knot, albeit with a different phase from the functioning knotters. In this way, as the strands 64a and 66a of twine are not engaged by any of the components movable with the frame 80, no knot is formed but the return of the frame 80 to its normal position at the end of each the slice tying cycle means that knotter is ready to form a knot at the end of a bale tying cycle.

If a strand to be used to form a bale is brought to the knotter side of the bale chamber while the knotter is inoperative, that is to say during a slice tying cycle of the needle assembly, it will be pulled back out of the bale chamber during the return movement of the needle assembly at the completion of the slice forming cycle, without forming a closed loop around the bale. Provided the twine is suitably tensioned, this will not interfere with the subsequent tying of a knot using the same strand during a bale forming cycle of the needle assembly.

For this reason it is preferred to guide the second strand of twine so that one of its two runs straddling the tip of the needle passes around a guide near the base of the needle which is movable with the needle, and the other passes around a stationary guide located near the tip of the needle when the latter is retracted from the bale chamber.

It is important that the twine should not snag on the crop material as it is being raised and lowered through the bale chamber and to assist in this it is desirable to form vertical recesses to accommodate the needles in the front face of the plunger used to compress the crop material in the bale chamber.

BRIEF DESCRIPTION OF THE DRAWINGS

The invention will now be described further, by way of example, with reference to the accompanying drawings, in which:—

DESCRIPTION OF THE PREFERRED EMBODIMENT(S)

Figure 3:
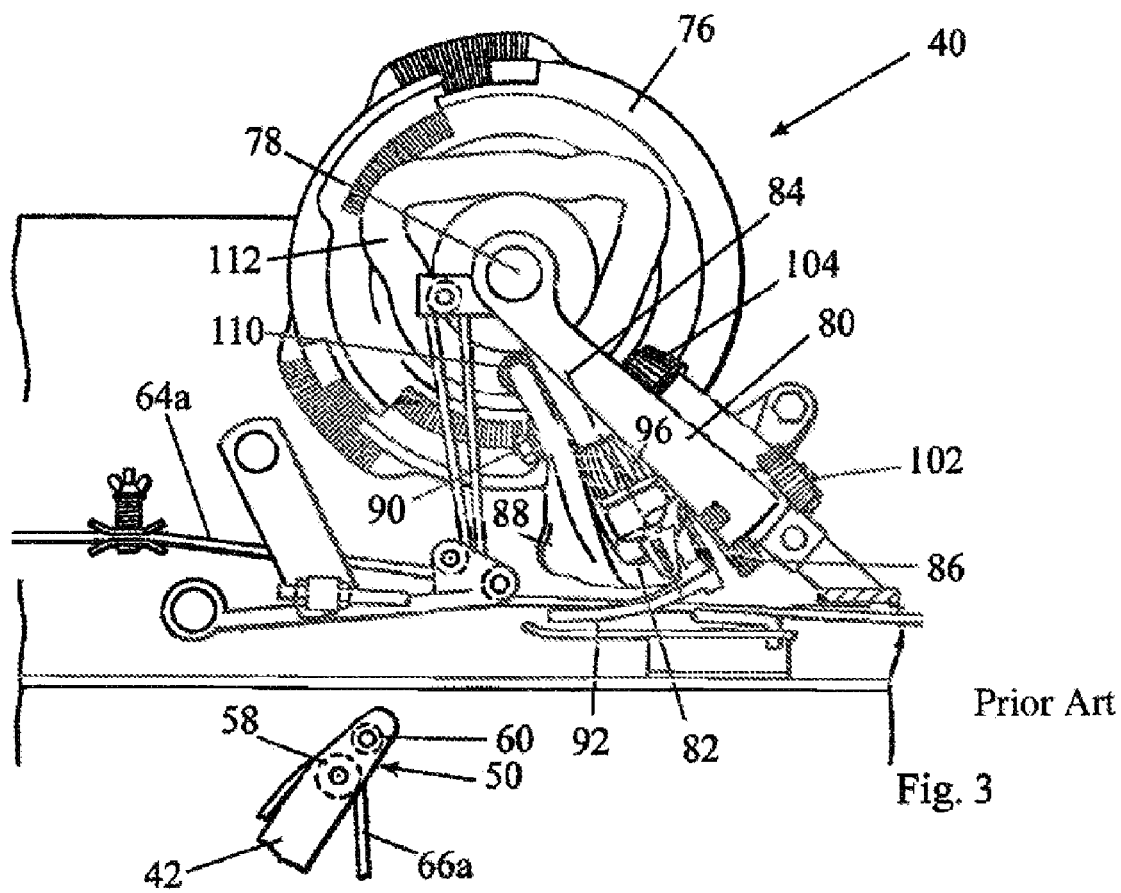
FIG. 3 is an enlarged, fragmentary, elevational view of the knotter, needle and associated mechanisms in mid cycle.
Figure 4:
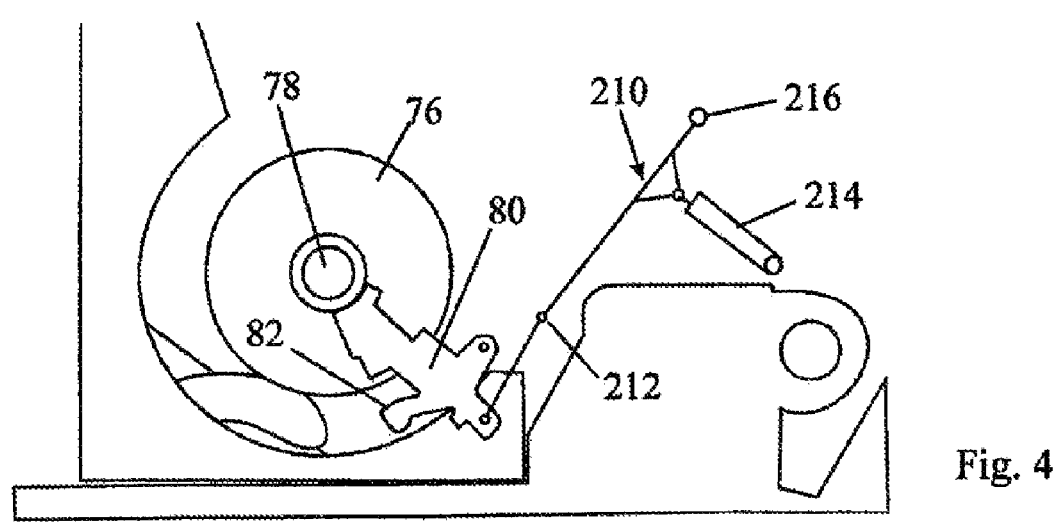
FIG. 4 is a highly simplified schematic representation in its operative state of a knotter similar to that of FIG. 3 but that may be selectively disabled by movement of its frame carrying twine engaging components.
Figure 5:
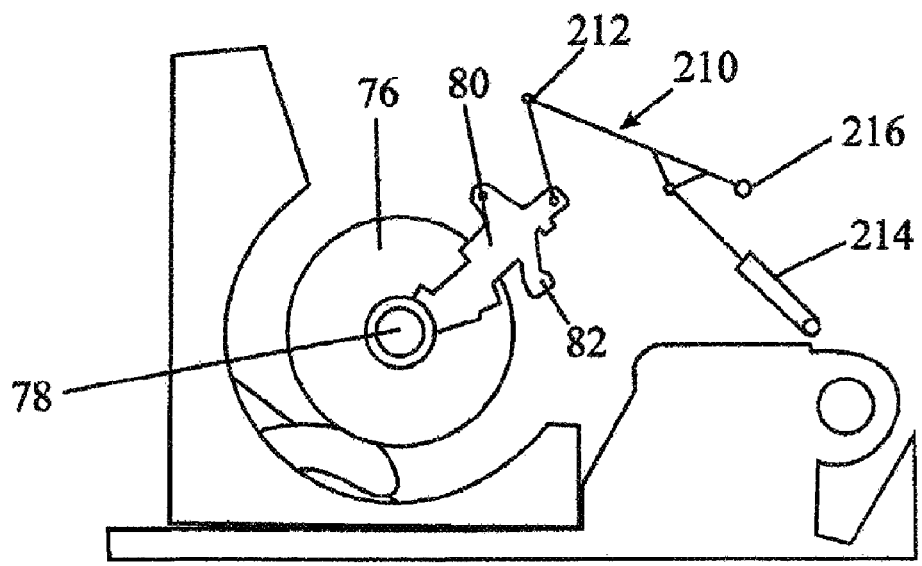
FIG. 5 is a similar schematic representation of the knotter of FIG. 4 when in its inoperative state.

The knotters used to tie twine around completed bales are capable of being selectively disabled during slice forming cycles of the needle assembly and are shown in FIGS. 4 and 5. The latter two figures are highly simplified views of a knotter similar to that of FIG. 3 but differing from it in that the frame member 80 can be rotated about the axis of the shaft 78 between an operative position shown in FIG. 4 and an inoperative position shown in FIG. 5.

Figure 1:
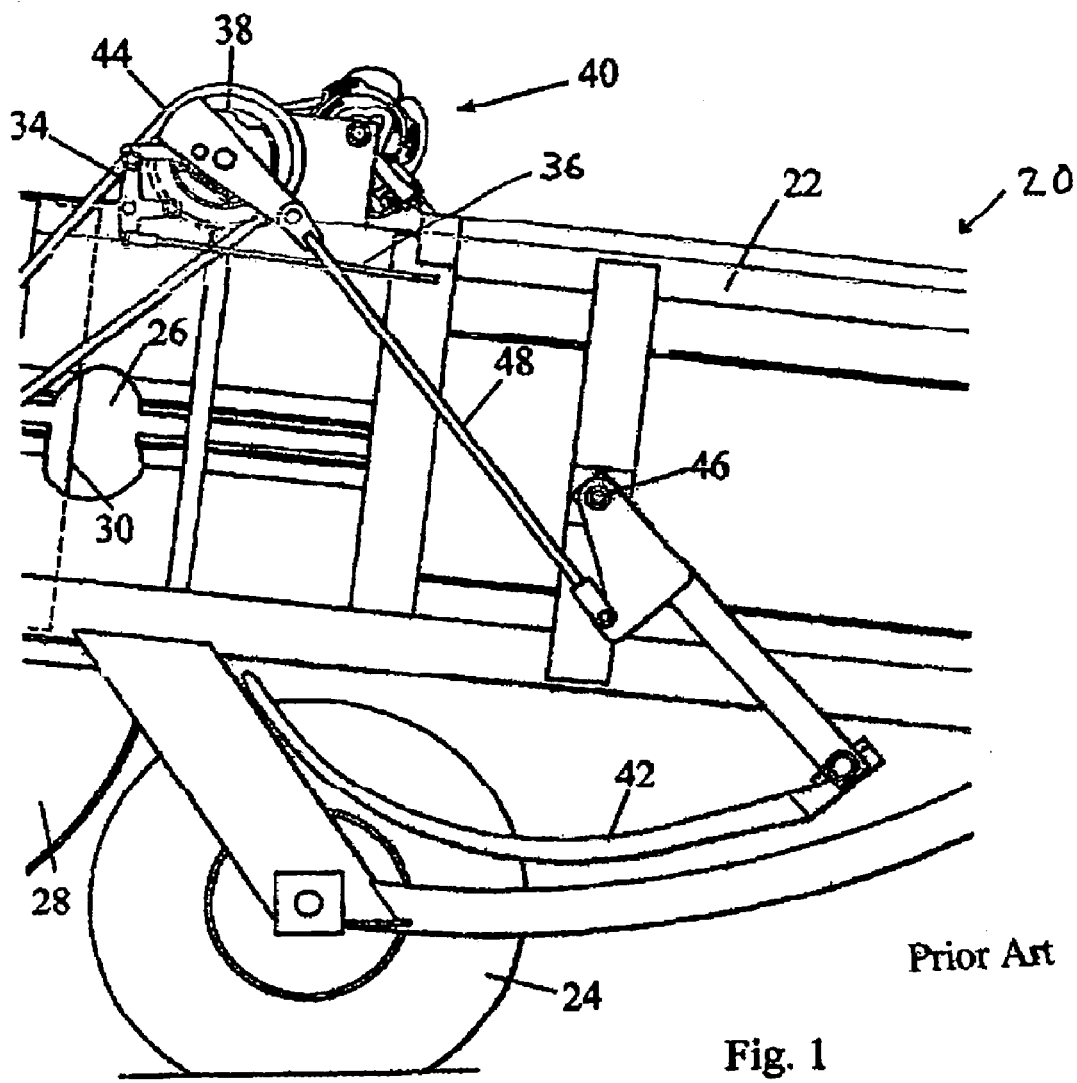
FIG. 1 is a fragmentary, elevational view of a baler.
Figure 2:
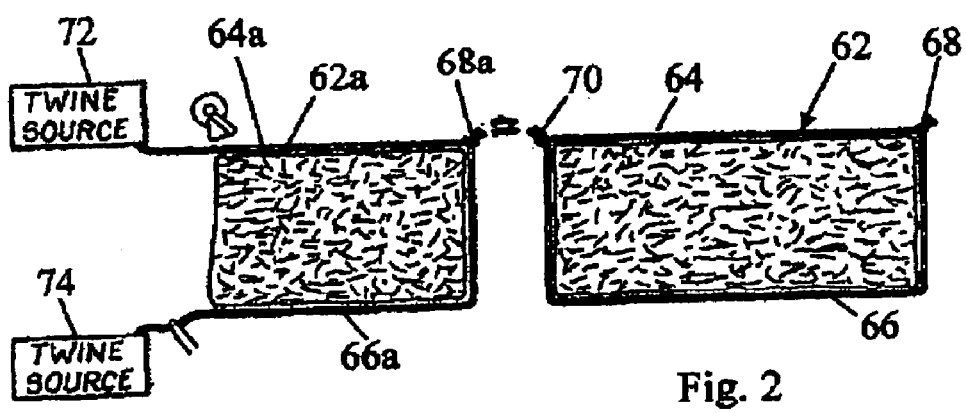
FIG. 2 a diagrammatic view of a complete and a partial double-knotted loop.

A trigger 34 connected to a mechanical bale length sensor, as described in U.S. Pat. No. 4,142,746 and shown in FIG. 1, does not suffice to initiate both the slice tying cycles and the bale tying cycles. It is possible and preferred to use an electronic sensor to initiate a slice tying cycle each time the bale has grown by a first amount, such as 50 cm, and a bale tying cycle when it has grown by a second amount, such as 2 m. Alternatively, a mechanical sensor can be used to initiate a slice tying cycle and a counter can be used to initiate a bale tying cycle, for example, every four slices.

In a slice tying cycle, all the needles are raised through the bale chamber. The knotters with the fixed frame 80 proceed to tie knots in the two strands of twine wrapped only around the last slice and prepare the twine for wrapping around the next slice. The frames 80 of the knotters associated with strands of twine to be wrapped around completed bales are however pivoted to the position shown in FIG. 5 in which the twine engaging components, are placed out of reach of the tip of the needle 42. Because the knotter is rendered inoperative in this way, no knot is formed and the bale is not completed.

When a bale has grown to its full desired size and a bale tying cycle is commenced, the frames 80 of all the knotters are lowered to the operative position shown in FIG. 4 and function in a conventional manner. In addition to the last formed slice being tied separately from the previously tied slices in the bale, knots are also formed in the strands of twine passing around the entire bale to keep all the slices together.

FIGS. 3 and 4 show schematically a hydraulically operated articulated lever arm 210 for raising and lowering the frame member 80. The arm 210 includes an elbow pivot 212 and is pivotable by a hydraulic jack 214 about a fixed shoulder pivot 216. It should be appreciated that the manner in which the frame member 82 is moved between its operative and inoperative position is not of fundamental importance to the invention and one may for example use a system of cables and pulleys instead of the articulated lever arm 210 or an electric motor or an air cylinder in place of the hydraulic jack 214.

Figure 6:
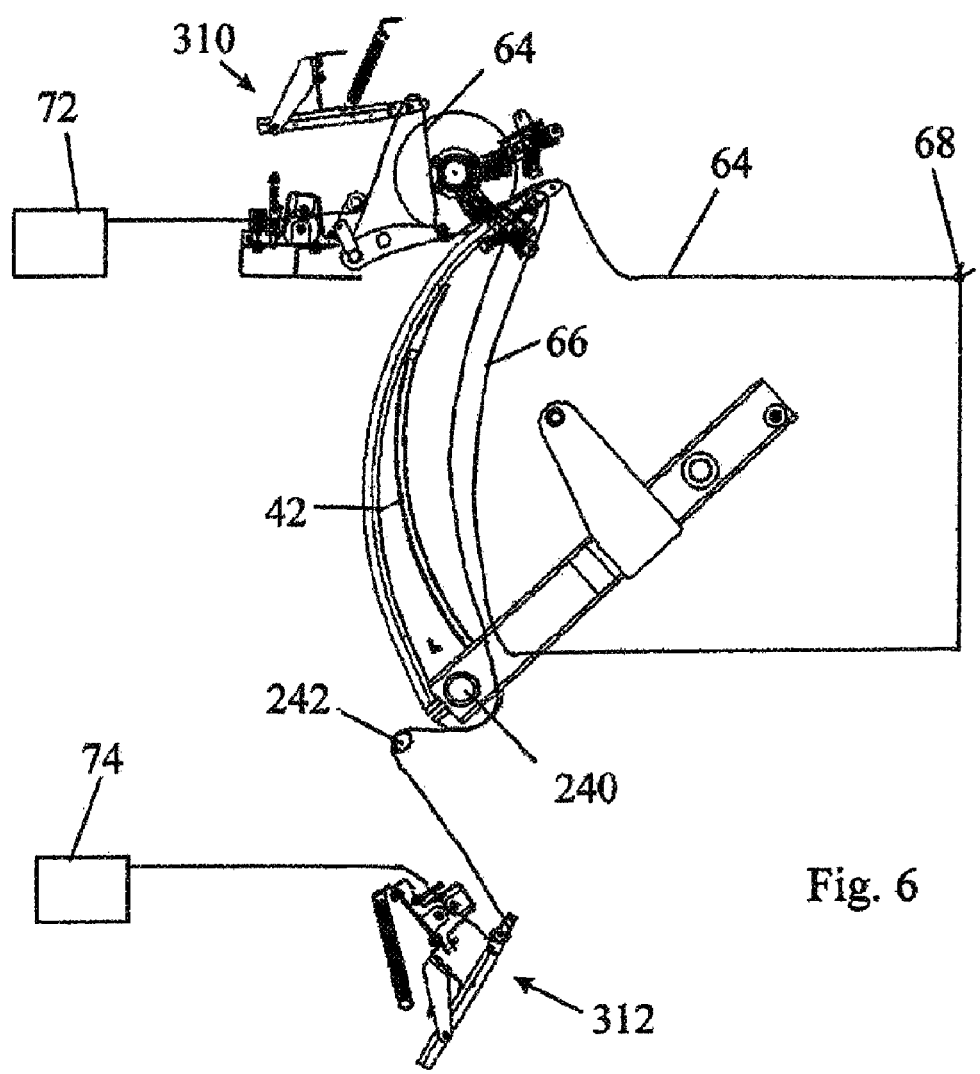
FIGS. 6 and 7 are schematic diagrams showing the path followed by the strands of twine as a needle is first raised then lowered without a knot being formed in the strands.
Figure 7:
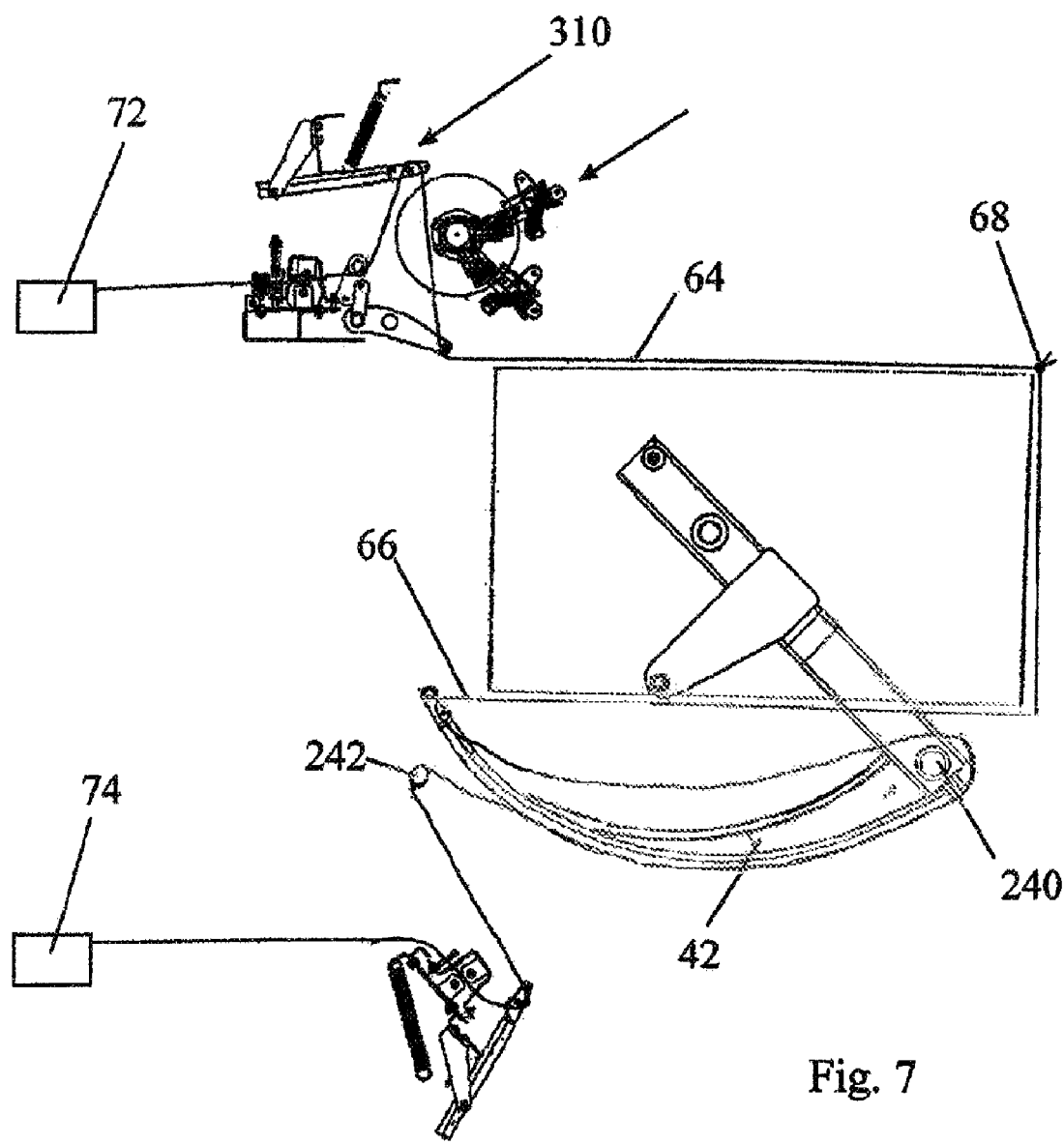

It is important, when the needles 40 are raised during a slice tying cycle, for the strands of twine wrapped around a complete bale to remain taut. To achieve this objective, the twine in one embodiment of the invention is guided in the manner shown in FIGS. 6 and 7. These two figures show a baler with a double-knotter drawing twine from two separate supply rolls 72, 74 through tensioners 310 and 312. FIG. 6 shows the baler when the needles have been raised through the bale chamber but frame 80 of the knotter 40 has been moved to its inoperative position so that no knot is formed. FIG. 7 shows the path of the twine after the needles 40 have been retracted from the bale chamber.

To maintain the twine taut at all times, one of the runs of the twine extending to the tip of the needle 40 is guided around the base 240 of the needle, i.e. the part remote from the tip and connected to the yoke of the needle assembly. The other run of twine is guided around a stationary pulley or guide 242 positioned near the tip of the needle 42 when it is in the retracted position shown in FIG. 7. By comparing FIGS. 6 and 7, it will be seen that the length of the two runs of twine extending from its tip to its base remains substantially constant in all positions of the needle so that the strands remain taut both as the needle moves up and as it moves down.

Thus, as the needle 42 is lowered from its position in FIG. 6 to that in FIG. 7, at the end of a slice tying cycle, no twine is drawn from either of the supplies 72 and 74 and instead the run extending from the base 240 of the needle is lengthened at the same time as the second run of twine from the eye of the needle 42 to the its base 240 is pulled out of the bale case. On the other hand, at the end of a bale typing cycle, the ends of the strands from the two supplies 72 and 74 will be tied to one another by the knotter 40 and the pivoting movement of the needle 42 will result in twine being drawn from the supply 74.

In an alternative embodiment of the invention, instead of having the loop fully around the back of the needles, it has been found preferable to provide a small roller on the underside of the needle near its connection point to the yoke. The full loop of the twine is then guided into the lower part of the needle, making it easier for it to be guided in between the two rollers 58 and 60 at the tip of the needle 42 in the conventional way. It will be appreciated that the principle of creating an excess of twine is identical to the embodiment already described.

To ensure that the twines should not snag on the crop material as the needles are raised and lowered through the bale chamber, vertical recesses are preferably formed in the front face of the plunger 22 used to compress the crop material in the bale chamber to accommodate the needles.

Having thus described the invention, what is claimed is:

1. A baler having a bale chamber and a plurality of needles movable through the bale chamber to pass respective strands of twine from one side of the bale chamber to associated knotters located on the opposite side of the bale chamber, the knotters having inclined frames carrying twine engaging components comprising:
   a first set of permanently operative knotters means for knotting strands of twine tied around individual slices on each occasion that the needles are moved through the bale chamber;
   a second set of knotters means having knotters means for knotting the associated strands of twine only at the end of the formation of a complete bale; and
   a linkage means for moving the inclined frames upwardly to a position out of reach of the associated strands of twine to selectively disabling the second set of knotters means.

2. A baler as claimed in claim 1, wherein the strands of twine are guided such that one of the two runs of twine straddling the tip of the needle passes around a guide near the base of each needle which is movable with the needle, and the other strand passes around a stationary guide located near the tip of the needle when the latter is retracted from the bale chamber.

3. A baler as claimed in claim 2, wherein a roller is provided on the underside of the needle near its base and a loop of twine is guided into the lower part of the needle.

4. A baler as claimed in claim 1, wherein the frames of the bale tying knotters carrying the twine engaging components of the knotter are pivotable about an axis of a drive shaft of the knotter by the linkage means, the linkage means connected to an electric motor, a pneumatic cylinder or a hydraulic jack.

5. A baler as claimed in claim 4, wherein the linkage means comprises an articulated arm pivotally connected between the frame and a stationary point on the baler.

* * * * *